(12) United States Patent
Banerjee et al.

(10) Patent No.: US 11,379,419 B2
(45) Date of Patent: Jul. 5, 2022

(54) AUTONOMOUS INTELLIGENT DATA PIPELINE COMPARATOR

(71) Applicant: SAP SE, Walldorf (DE)

(72) Inventors: Rick Banerjee, Bangalore (IN); Smita Minakshi, Bangalore (IN); Vikram Reddy, Bangalore (IN); Kundan Bora, Bangalore (IN)

(73) Assignee: SAP SE, Walldorf (DE)

( * ) Notice: Subject to any disclaimer, the term of this patent is extended or adjusted under 35 U.S.C. 154(b) by 160 days.

(21) Appl. No.: 16/699,183

(22) Filed: Nov. 29, 2019

(65) Prior Publication Data

US 2021/0165763 A1 Jun. 3, 2021

(51) Int. Cl.
*G06F 16/17* (2019.01)
*G06F 16/903* (2019.01)

(52) U.S. Cl.
CPC .... *G06F 16/1734* (2019.01); *G06F 16/90335* (2019.01)

(58) Field of Classification Search
None
See application file for complete search history.

(56) References Cited

U.S. PATENT DOCUMENTS

| | | | | |
|---|---|---|---|---|
| 2002/0143753 A1* | 10/2002 | Kawase | | G06F 16/958 |
| 2014/0324807 A1* | 10/2014 | Wen | | G06F 16/951 |
| | | | | 707/706 |
| 2015/0277965 A1* | 10/2015 | Bradshaw | | G06F 9/466 |
| | | | | 718/101 |
| 2018/0157704 A1* | 6/2018 | Robichaud | | G06F 16/24532 |
| 2019/0080016 A1* | 3/2019 | Avihail | | H04L 67/16 |
| 2019/0259040 A1* | 8/2019 | Athannassov | | G06F 16/958 |
| 2019/0354416 A1* | 11/2019 | Schleifer | | G06F 9/541 |
| 2020/0167151 A1* | 5/2020 | Kuan | | G06F 16/219 |
| 2021/0142159 A1* | 5/2021 | Gupta | | G06N 3/08 |

FOREIGN PATENT DOCUMENTS

WO WO-2019029155 A1 * 2/2019 ............. G06F 16/27

* cited by examiner

*Primary Examiner* — Augustine K. Obisesan
(74) *Attorney, Agent, or Firm* — Buckley, Maschoff & Talwalkar LLC

(57) ABSTRACT

Briefly, embodiments of a system, method, and article for transmitting, from a first application, a query for a domain entity associated with a second application. A transformation microservice may receive change data indicating modifications to the domain entity associated with the second application. The second application may execute the query on data for the domain entity associated with the first application and may generate a first output file with query results. The transformation microservice may execute the query on the change data for the domain entity associated with the second application and generating a second output file with query results. The first output file and the second output file may be sent to a comparison microservice. The comparison microservice may determine whether there are differences between the query results of the first output file and the second output file.

20 Claims, 9 Drawing Sheets

AUTONOMOUS INTELLIGENT DATA PIPELINE COMPARATOR

BACKGROUND

Multi-tenant legacy procurement software-as-a-service (SaaS) applications often include one application which pulls data from another application. One of the reasons to do this is to extract data, transform the data, and then load the data to a data warehouse. Another reason to pull data in this manner may be to gain access to master data, e.g., data which is common within a particular software ecosystem, or data relating to users, groups, permissions, roles, or commodity codes, to name just a few examples among many within a business application environment. As a result of the pulling of data between applications, a data pipeline may be built or constructed between the two applications.

Different types of applications may include a monolithic architecture and/or a microservices architecture. A monolithic architecture may comprise a single-tiered software application in which a user interface and data access code are combined into a single program from a single platform. A monolithic architecture may be self-contained, and independent from other computing applications. One particular design philosophy for a monolithic architecture is that an application is responsible not just for a particular task but may perform every step needed to complete a particular function.

Microservices comprise a software development technique, e.g., a variant of a service-oriented architecture (SOA) architectural style which structures an application as a collection of loosely coupled services. In a microservices architecture, services may be fine-grained, and protocols may be lightweight. A benefit of decomposing an application into different smaller services is that it may improve modularity to therefore make an application easier to understand, develop, test, and become more resilient to architecture erosion. A microservices architecture may parallelize development by enabling small autonomous teams to develop, deploy and scale their respective services independently. A microservices architecture may also allow an architecture of an individual service to emerge through continuous refactoring. Microservice-based architectures may additionally facilitate continuous delivery and deployment, for example.

As a result of natural architectural modifications which may be needed to move or transition from a monolithic architecture to a microservices architecture, such architecture changes may be employed to use a microservice to carry out data retrieval and transformation from an application, potentially using an event sourcing architecture. A data pipeline may start with an application which is a source of certain data, from where the data is pushed to the microservice, and where the data is transformed. A target application may subsequently pull the data from the microservice. This process leads to the creation of a new data pipeline.

An issue or problem facing designers of this new data pipeline is how to certify that the new pipeline is correctly extracting and transforming data. This may be particularly difficult within a multi-tenant cloud environment where a business domain object model may be customized by customers. Data available in test environments may not be able to surface actual issues or regressions introduced in extraction and/or transformation processes. This problem may be difficult, for example, because without gaining reasonable confidence in the new data pipeline, it is impossible to completely decommission the old data pipeline. However, to be able to gain confidence in the data quality produced by the new data pipeline, the new data pipeline may need to be tested against live data, for example.

BRIEF DESCRIPTION OF THE DRAWINGS

Features and advantages of the example embodiments, and the manner in which the same are accomplished, will become more readily apparent with reference to the following detailed description taken in conjunction with the accompanying drawings.

Figure 1:
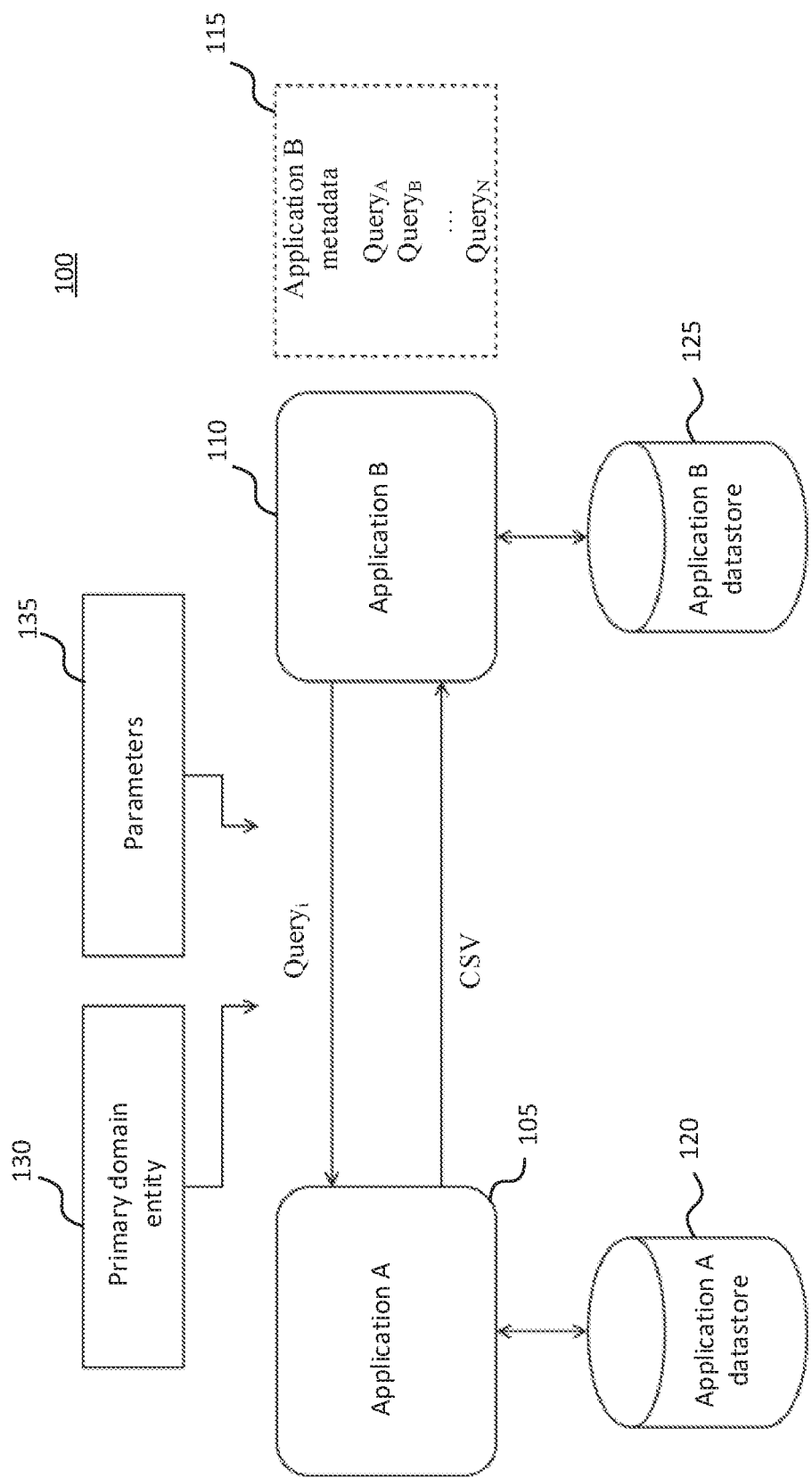
FIG. 1 illustrates an embodiment of a framework of a monolithic architecture to build a data pipeline between two different applications.

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown but is to be accorded the widest scope consistent with the principles and features disclosed herein.

Multi-tenant legacy procurement software-as-a-service (SaaS) applications often include one application which pulls data from another application. For example, a data pipeline may be utilized by an application to pull data from another application. A "data pipeline," as used herein, refers to is a set of data processing elements connected in series, where the output of one element is the input of the next one. A particular legacy application may utilize a data pipeline comprising a monolithic architecture. However, as the legacy application is modified or updated over time, the monolithic architecture may be replaced with a microservices architecture. A "microservice," as used herein, refers to a software development technique which structures an application as a collection of loosely coupled services. A data pipeline comprising a monolithic architecture may comprise a single-tiered software application in which a user interface and data access code are combined into a single program from a single platform. A different data pipeline comprising a service architecture, on the other hand, may comprise an architectural style which structures an application as a collection of loosely coupled service.

An issue or problem facing designers of this new data pipeline is how to certify that the new pipeline is correctly extracting and transforming the data. This may be particularly difficult in a multi-tenant cloud environment where a business domain object model may be customized by customers. Data available in test environments may not be able to surface actual issues or regressions introduced in extraction and/or transformation processes. This problem may be difficult, for example, because without gaining reasonable confidence in the new data pipeline, it is impossible to completely decommission the old data pipeline. However, to be able to gain confidence in the data quality produced by the new data pipeline, the new data pipeline may need to be tested against live data, for example.

There are different ways in which to determine whether a newly introduced data pipeline generates the same output data as a legacy or old data pipeline. According to one particular solution, customer data may be exported and brought over to a testing environment. Once the customer data has been added to the testing environment, the customer data may be pushed to both the old data pipeline and the new data pipeline. The results may be compared, and errors may be discovered in the new data pipeline.

This approach, however, has certain shortcomings. For example, in a multi-tenant cloud software-as-a-service environment, the data size, even for a subset of customers, is typically enormous. It may therefore be extremely difficult to have this customer data exported out from a production environment and then loaded into a test environment. The test environment infrastructure may not be able to scale to this data volume.

Another shortcoming with this approach relates to legal implications with exporting customer data from production, especially after the European Union's General Data Protection Regulation (GDPR) regulations have come into force. For example, in order to comply with GDPR regulations, data will have to be cleansed before it may be loaded into a test environment. However, this cleansing and loading process may take a long time and may severely impede progress in comparing the outputs from the two data pipelines.

One or more embodiments, as discussed herein, are directed to an approach for comparing the outputs of two different data pipelines. For example, in accordance with an embodiment, a system may be deployed which has an ability to compare respective outputs of old and new data pipelines within a production environment and may discover data quality issues within the new pipeline. Such an approach may utilize an autonomous intelligent data pipeline comparator, which may take production data as transactions are occurring and use this production data to create an output in the new pipeline. An "autonomous intelligent data pipeline comparator," as used herein, refers to one or more components or entities which may extract an output from one data pipeline and compare this output with an output from a different data pipeline. For example, an autonomous intelligent data pipeline comparator may have an ability to create a detailed report of any anomalies in the data between the two outputs. Accordingly, an autonomous intelligent data pipeline comparator may allow for validation of a newly introduced data pipeline in production, with real data and may also include domain object model customizations made by the customers, in an SaaS scenario, for example.

FIG. 1 illustrates an embodiment 100 of a framework of a monolithic architecture to build a data pipeline between two different applications, e.g., Application A 105 and Application B 110. Embodiment 100 may comprise a model in which data may be pulled from Application A 105 in response to a query from Application B 110. In one particular implementation, elements of a data pipeline may be executed in parallel or in a time-sliced fashion. For example, some amount of buffer storage may be inserted between elements. As illustrated, a data pipeline may be generated or constructed between Application A 105 and Application B 110. For example, Application B 110 may include or have access to Application B metadata 115 which may comprise various queries, such as $Query_A$, $Query_B$, and $Query_N$, to name just a few example queries. For example, the queries of Application B metadata 115 may comprise Structured Query Language (SQL) queries. In accordance with an embodiment, SQL may comprise a domain-specific language which may be used in programming and may be designed to manage data held in a relational database management system, or for stream processing in a relational data stream management system. SQL may be particularly useful in handling structured data, e.g., data incorporating relations among entities and variables. The queries of Application B metadata 115 may have a primary business domain entity such as, e.g., "Requisition" or "PurchaseOrder." A "primary business domain entity," as used herein, refers to a portion of an application which encodes real-world business rules that determine how data can be created, stored, and/or changed, for example. A primary business domain entity may be contrasted with a remainder of an application which may be concerned with lower-level details of managing a database or displaying the user interface, system infrastructure, or generally connecting various parts of the application, for example.

In embodiment 100, Application A 105 may be in communication with its own datastore, e.g., Application A datastore 120. Similarly, Application B 110 may be in communication with its own datastore, e.g., Application B datastore 125. Communications between Application A 105 and Application B 110 may relate to a particular query which is associated with a primary domain entity 130 and parameters 135. Parameters 135 may include information such as a Customer Identifier (ID), and information relating to the time period for the query, such as TimeStart and TimeEnd, indicating a start time and end time, respectively, for a particular query, in accordance with an embodiment.

Application B 110 may include a scheduled thread or process, which may be periodically executed or run and may pull data from Application A 105. For example, in order for Application B 110 to pull data from Application A 105, Application B 110 may transmit a request for the data to Application A 105, and Application A 105 may transmit a response to Application B 110 which comprises the requested data. A mechanism for running or executing a query is to send the query from Application B 110 to Application A 105 via a HyperText Transfer Protocol (HTTP) message. Upon receipt of such an HTTP message, Application B 110 may execute the query. Application A 105 may execute the query on data or information stored in Application A datastore 120 and may transform the results of the query into a format, such as a file format, expected or requested by Application B 110. After executing the query, Application A 105 may provide the results to Application B 110 in an agreed-upon format, such as via a Comma-Separated Values (CSV) file or a JavaScript Object Notation (JSON) file, for example.

To be able to checkpoint or otherwise identify how much of the data from Application A datastore 120 is to be read, a start time and an end time for time-stamped data which is to be queried may be used by Application A 105 to ensure that data from discrete-time windows is retrieved and loaded from Application A datastore 120. Primary business domain entities which have been created or updated during such a time window, e.g., between the start time and the end time, may be processed to determine query results. In accordance with an embodiment, a start time and an end time may therefore be specified in a request transmitted from Application B 110 to Application A 105 along with the query which is to be executed.

Embodiment 100 may be implemented within a multi-tenant cloud environment. For example, Application A 105 may have or store data for multiple customers in Application A datastore 120. Such customers may also be represented by Application B 110, in accordance with an embodiment. Accordingly, when pulling data, Application B 110 may specify which customer's data is to be retrieved.

As discussed above, Application B metadata 115 may comprise various queries. For example, a query may include a primary domain as its focus. The query may indicate one or more customers for which to search for customer-related data. A query may include a selection from a business domain entity, such as a requisition with various filter criteria, including join operations, for example.

As discussed above, a query, such as Query A, may be encapsulated or otherwise converted or coded into an HTTP request. For example, Application B may generate an HTTP request to send to Application A. Such an HTTP request may include parameters specifying a customer and a start time and an end time. The HTTP request may be transmitted via a back-end port available to Application B to a servlet available to Application A, for example. The HTTP request may include Query A. The HTTP request may also specify a Customer ID for a particular customer whose data is to be a subject of Query A. In a particular example, an HTTP request may specify a particular servlet associated with or accessible to Application A which is to receive the HTTP request. Upon receipt by the servlet, Application B may perform Query A, such as on data stored within Application A datastore 120.

In accordance with an embodiment, queries may be transmitted from Application B to Application A for execution for a relatively large number of domain objects and for a relatively large number of customers. However, because of a relatively large number of queries being performed by Application A, the database for Application A may become overly loaded, potentially resulting in impaired performance, such as reduced system throughput, for example. For example, in addition to performing its typical or regular transactions, a database for Application A may become overloaded if it has to additionally execute or perform a voluminous number of pulled queries for Application B or other applications. Moreover, Java™ nodes for Application A may also become adversely affected, potentially resulting in database memory issues, which may potentially result in the database being taken offline.

Another architecture may be implemented which utilize microservices, such as to reduce the amount of processing on a database which implements Application A, for example. Various architectural modifications may be made to transition from a monolithic architecture to a microservices architecture for a data pipeline. For example, architecture changes may make use of one or more microservices to carry out data retrieval and transformation, potentially using an event sourcing architecture.

Figure 2:
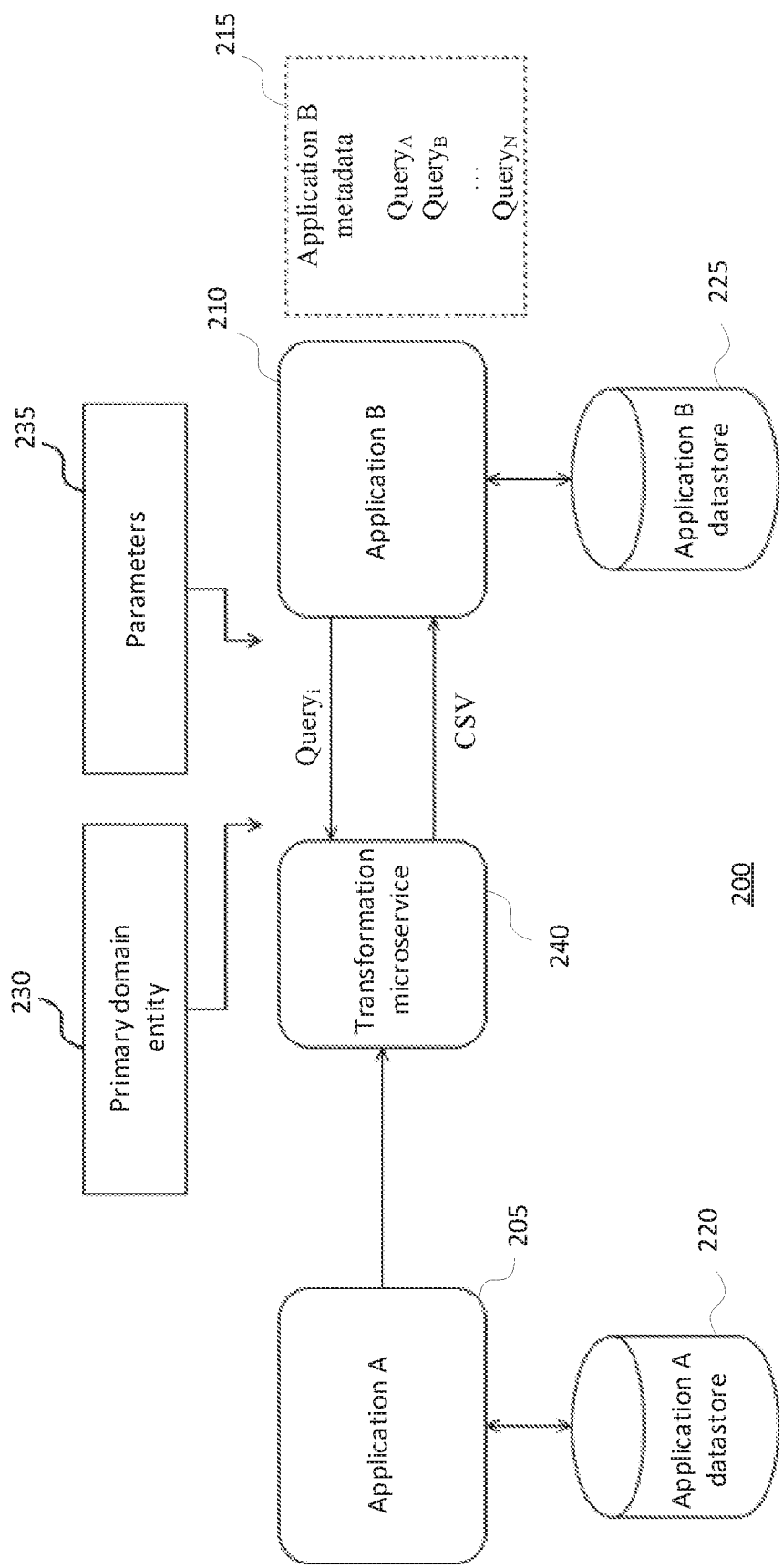
FIG. 2 illustrates an embodiment of a framework of a microservice architecture to build a data pipeline between two different applications

FIG. 2 illustrates an embodiment 200 of a framework of a microservice architecture to build a data pipeline between two different applications, e.g., Application A 205 and Application B 210. Embodiment 200 includes several objects or entities similar to those of embodiment 100 of FIG. 1, such as Application B metadata 215, Application A datastore 220, Application B datastore 225, primary domain entity 230, and parameters 235. However, embodiment 200 additionally includes a transformation microservice 240.

In embodiment 200, Application A 205 may send change data for a domain entity to Transformation Microservice 240 which may, in turn, collect and store the changes. For example, whenever a data item in Application A datastore 220 for a particular customer is created, updated/editing, or deleted, corresponding changes may be sent by Application A 205 to Transformation Microservice 240. For example, whereas embodiment 100 of FIG. 1 comprises a model where data may be pulled from an Application in response to a query, embodiment 200 of FIG. 2 comprises a model where Application A 205 may push certain information, such as change data, to Transformation Microservice 240.

In embodiment 200, queries transmitted by Application B 210 for data relating to Application A 205 may be executed or run by Transformation Microservice 240. In response to executing a query, Transformation Microservice 240 may generate and send or otherwise transmit a file with query results, such as a CSV file, to Application B 210.

One issue facing designers of a data pipeline in accordance with embodiment 200 of FIG. 2 is how to certify that this data pipeline is correctly extracting and transforming the data. In other words, because of the introduction of Transformation Microservice 240, there is a possibility that an error may be potentially introduced by Transformation Microservice 240, in which case a query result, such as a CSV file generated by Transformation Microservice 240, may not be identical to a query result, such as another CSV file, generated by an application in accordance with a data pipeline in accordance with embodiment 100 of FIG. 1. It may be particularly difficult to guarantee that a pipeline in accordance with embodiment 200 is generating accurate results in a multi-tenant cloud environment where a business domain object model may be customized by customers. For example, data available in test environments may not be able to replicate or otherwise surface actual issues or regressions introduced in data extraction and transformation processes. Guaranteeing accuracy of query results may comprise a difficult problem because without gaining reasonable confidence in such a microservice data pipeline, it may be impossible to completely decommission a monolithic data pipeline. However, in order to be able to gain confidence in the data quality produced by a microservice pipeline, the microservice pipeline may be tested against live data.

In accordance with one or more embodiments, a comparison microservice may be added to determine whether query results from a microservice data pipeline is equivalent to query results from a monolithic data pipeline. For example, a system may be deployed which may compare the query results from the different data pipelines in a production environment and may therefore discover any data quality issues in the microservice data pipeline. Such a comparison microservice may compare such query results from the microservice data pipeline and a monolithic data pipeline during a live implementation, such as at runtime, and may report any detected discrepancies. For example, settings or parameters of a transformation microservice of a microservice data pipeline may be adjusted to improve fidelity or code for a transformation microservice may be modified, for example. For example, regressions may be identified in data from query results.

In accordance with an embodiment, a query result file, such as a CSV file, from a transformation microservice may be compared with a query result file, such as another CSV file, determined by an application itself, in order to identify any discrepancies. A comparison microservice may report on any problems or issues it detects, such as if a transformation microservice has created data which should not have been created, has deleted or edited data incorrectly, or has created different types of data which should not have been created, for example.

Figure 3:
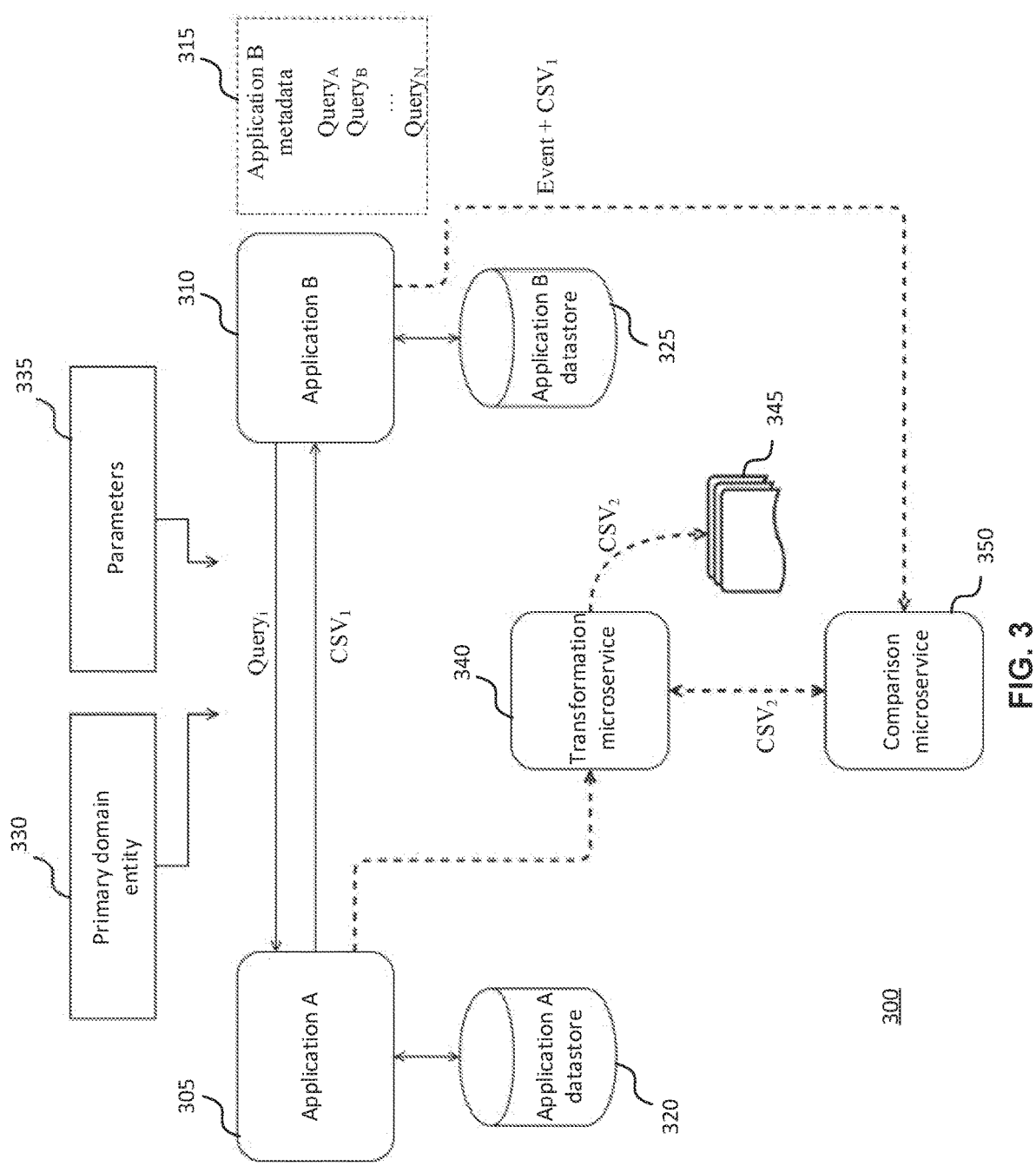
FIG. 3 illustrates an embodiment of a framework of a both a monolithic architecture and a microservice architecture to build a data pipeline between two different applications.

FIG. 3 illustrates an embodiment 300 of a framework of a both a monolithic architecture and a microservice architecture to build a data pipeline between two different applications, e.g., Application A 305 and Application B 310. Embodiment 300 illustrates various items or components, such as Application A 305, Application B 310, Application B metadata 315, Application A datastore 320, Application B datastore 325, Primary Domain Entity 330, Parameters 335, Transformation Microservice 340, Comparison Microservice 350, and a Transformation Microservice Datastore 345, for example.

In embodiment 300, Application B 310 may send $Query_i$ for execution to Application A 305. For example, Application A 305 may execute $Query_i$ on Application A datastore 320 to determine query results, which may be stored in an output file, such as $CSV_1$. As illustrated in FIG. 1, $CSV_1$ may be sent from Application A 305 to Application B 310.

Any changes to data stored in Application A data store 320 may be pushed by Application A 305 to Transformation Microservice 340. Transformation Microservice 340 may determine its own query results for $Query_i$ transmitted from Application B to Application A, so that the accuracy of the query results from Transformation Microservice 340 may be compared with the query results determined by Application A 305 and which are stored in $CSV_1$ in this example. For example, $Query_i$ may be provided to Transformation Microservice 340 either by Application A 305 or by Comparison Microservice 350, which may receive $Query_i$ directly from Application B 310. Transformation Microservice 340 may, for example, obtain $Query_i$ from Application B 310. In one particular embodiment, Transformation Microservice 340 may receive $Query_i$ via a Metadata exchange.

Transformation Microservice 340 may execute $Query_i$ against data indicative of changes to data stored in Application A datastore 320 which have previously been received from Application A 305. For example, Transformation Microservice 340 may store query results in an output file, such as $CSV_2$, as illustrated. Transformation Microservice 340 may store $CSV_2$ in Transformation Microservice Datastore 345, for example. Transformation Microservice 340 may also provide $CSV_2$ to Comparison Microservice 350. For example, Transformation Microservice 340 may either push $CSV_2$ to Comparison Microservice 350, or Comparison Microservice may pull $CSV_2$ from Transformation Microservice 340. As illustrated in FIG. 3, Application B 340 may send event data and a copy of $CSV_1$ which it received from Application A 305 to Comparison Microservice 350. Event data may include information such as information about which queries have been executed and with which parameters, for example.

Upon receipt of the event data, $CSV_1$, and $CSV_2$, Comparison Microservice 350 may compare the query results in the content of $CSV_1$ and $CSV_2$ to determine whether the content is identical. If, for example, the content of $CSV_1$ and $CSV_2$ is not identical, Comparison Microservice 350 may identify the differences and may store information indicative of the differences in a file for consideration by a coder or debugger of Transformation Microservice 340. In some embodiments, a file indicative of the differences between $CSV_1$ and $CSV_2$ may be provided to Transformation Microservice 340 so that Transformation Microservice 340 may automatically adjust its own settings and/or parameters, for example.

For example, Comparison Microservice 340 may store events as well as $CSV_1$ in a data store and may maintain a mapping between the event data and $CSV_1$. Comparison Microservice may periodically pull events processed by the Transformation Microservice 340 and the corresponding $CSV_2$.

Figure 4:
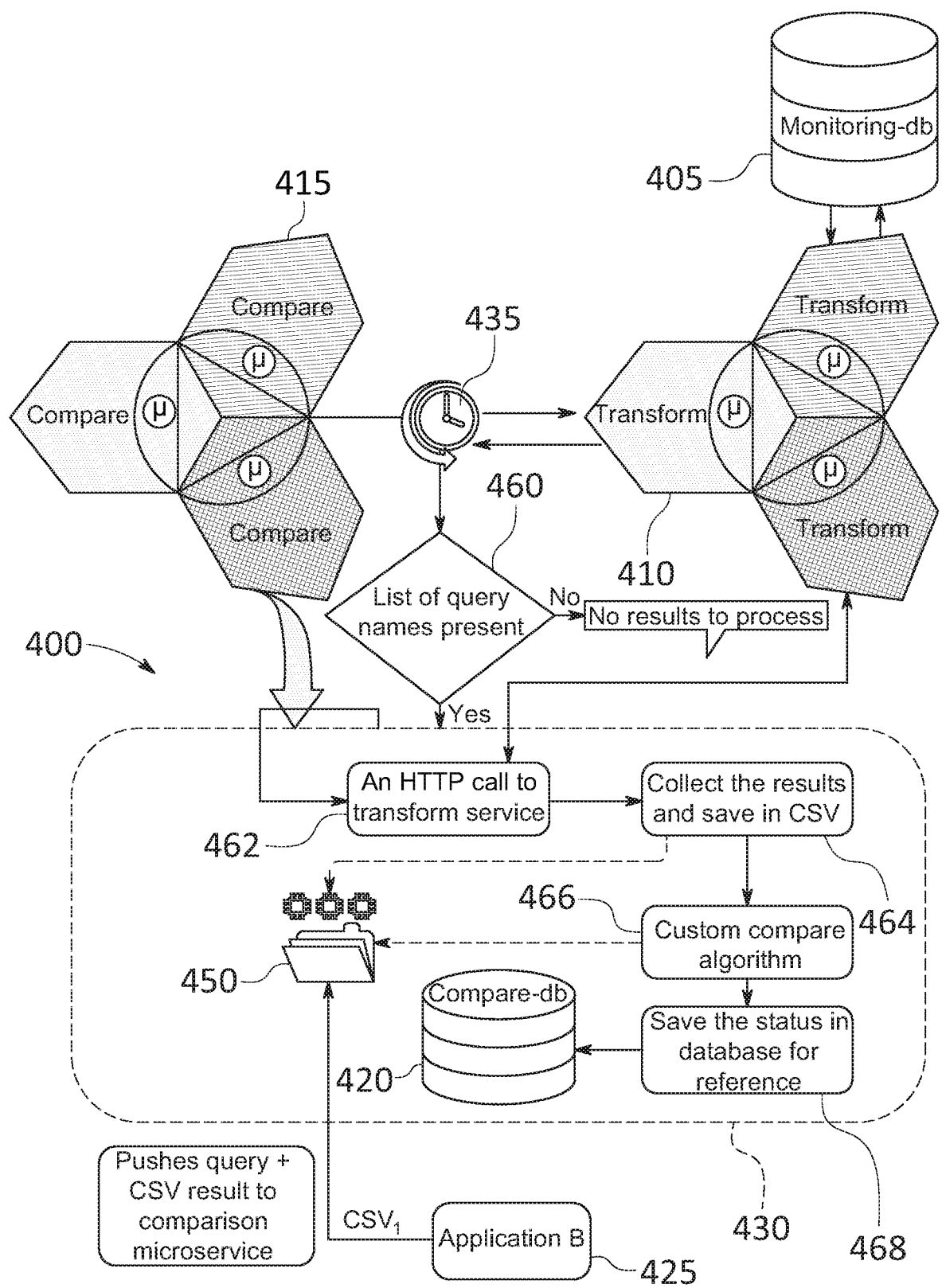
FIG. 4 is an embodiment of a flow diagram of processing of a data pipeline.

FIG. 4 is an embodiment 400 of a flow diagram of processing of a data pipeline in accordance with embodiment 300 of FIG. 3. Embodiment 400 illustrates interactions between various entities of a data pipeline, such as a Monitoring database (db) 405, a Transformation Microservice 410, a Comparison Microservice 415, a Comparison db 420, and an application, such as Application B 425. In embodiment 400, Transformation Microservice and/or Comparison Microservice may include multiple nodes, such as three nodes apiece in an example shown in FIG. 4, although it should be appreciated that more or fewer nodes may be utilized in some embodiments. Within the realm of microservices, multiple nodes may result in faster processing of data. As the amount of data to process by Comparison Microservice 415 is relatively large, system throughput or processing speed may be improved, for example, by distributing the processing load across multiple nodes so that queries may be processed parallelly, e.g., to improve overall speed of processing queries. Use of multiple nodes may additionally reduce the impact of failures, such as if one node goes down in a cluster of three nodes, there may still be two remaining operational nodes.

FIG. 4 also illustrates a pictorial representation 430 of Comparison Microservice 415. For example, for the sake of illustration, pictorial representation 430 is shown in FIG. 4 to illustrate internal modules, items, and/or processing which may be included within or performed by Comparison Microservice 415, for example.

In embodiment 400, Application B 425 may push event data and a CSV file associated with that event data. For example, Application B 425 may receive a an output file, such as $CSV_1$, with search query results from another application, e.g., an Application A, which is not shown in FIG. 4. The $CSV_1$ file may include the output of the event which may be generated. For example, $CSV_1$ may be stored in a memory or database, such as a Comparison Microservice Database 450, which is accessible to Comparison Microservice 415.

For example, every event which is executed by an Application A, such as a create, edit, or delete event for a business domain object, may be logged into Transformation Microservice 410. Transformation Microservice 410 may store all changes relating to one or more fields of such event data in monitoring-db 405. Each event may be associated with a unique event identifier (ID). The unique event ID may act or serve as a primary key, and a customer ID may serve as a secondary ID for the event data change, for example.

A Scheduler 435 may query the Transformation Microservice 410 at certain time intervals, such as every five minutes in one particular implementation. However, the Scheduler 435 may be configured to query the Transformation Microservice 410 at different time intervals in other implementations, for example. A query sent from Scheduler 435 to Transformation Microservice 410 may indicate a start time and an end time for the query. Upon receipt of a query from Scheduler 435, Transformation Microservice 410 may query monitoring-db 405 to identify whether any business objects have been updated, created, or deleted within a requested time interval and may receive results of this query from the monitoring-db 405. Any changes received from the monitoring-db 405 may be collated or arranged into an agreed-upon form or format, such as a JSON file, and may be sent to Comparison Microservice 415. If the JSON file indicates that there are no results to process, for example, such as where there were no changes within the requested time interval, Scheduler 435 may wait until the next time interval to send another query to Transformation Microservice 410. For example, the end time for the query may comprise the current time and the start time may comprise a time which is five minutes prior.

If query results are received by Scheduler 435, a determination may be made as to a list of query names present at operation 460. If there are no results to process, then the Comparison Microservice 415 may wait until there are query results to process. However, at operation 460, if there are query results, the Comparison Microservice 415 may process those query results. Comparison Microservice 415 may identify a query name and its primary-key and may create an SQL query which may be interpreted by Application A. Transform Microservice 410 may executes queries as and when there are updates to Application A. After queries have been executed, the results may be collected and saved in an output file, such as $CSV_2$ or in a JSON file. For example, $CSV_2$ may be stored in Comparison Microservice Database 450. Comparison Microservice 415 may make one or more HTTP calls to fetch these files based on query parameters.

At operation 466, a Custom Compare Algorithm, as discussed further below, may be implemented or Custom Compare processing may be performed to compare the query results of $CSV_1$ and $CSV_2$. Results of the Custom Compare processing may be saved within a compare-db 420 at operation 468. For example, a status of the comparison may be saved in the compare-db 420 for future reference or future processing, such as to refine or modify one or more operations of the Comparison Microservice 415 until the results of future determinations of $CSV_1$ and $CSV_2$ are identical.

Transformation Microservice 410 may monitor or keep track of every incoming event by storing the incoming event in its monitoring-db 405, for example. The event data which is stored for future processing of the event in the monitoring-db include field names and corresponding descriptions, as shown below in Table A:

TABLE A

Event Data

| Field Name | Description |
| --- | --- |
| QUERY_EXECUTION_ID | A combination of unique event-id and query name |
| CUSTOMER_ID | A unique customer id |
| BASE_ID | A primary key for the SQL Query |
| CSV_FILE_TIME_CREATED | Timestamp at which the CSV file is created |
| QUERY_NAME | Unique query name |
| ERROR_ID | Unique error id if the query fails |
| EVENT_ID | Unique identifier for each incoming event |
| QUERY_EXECUTION_STATUS | Status of the query executed |
| QUERY_TIME_CREATED | Time of the query creation |
| QUERY_TIME_UPDATED | Time of the query updated |
| DOMAIN_OBJECT_NAME | Unique Business Domain Object |
| VARIANT | ERP Variant |
| CLUSTER_HOSTNAME | Name of host from which event is generated |
| TIMEZONE | Timezone of the event |

As illustrated in Table A, field name "QUERY EXECUTION ID" may comprise a combination of a unique event-id and a query name. Field name "CUSTOMER_ID" may comprise a unique customer id. Field name "BASE_ID" may comprise the primary key for a SQL Query for Transformation Microservice 410. Field name "CSV_FILE_TIME_CREATED" may comprise a timestamp at which Transform Microservice 410 created the CSV file. Field name "QUERY_NAME" may comprise a unique query name. Field name "ERROR_ID" may comprise a unique error id which may be generated if the query fails in the Transform Microservice 410. Field name "EVENT_ID" may comprise a unique identifier for each incoming event in Transformation Microservice 410. Field name "QUERY_EXECUTION_STATUS" may comprise a status of the query executed by Transform Microservice 410. Field name "QUERY_TIME_CREATED" may comprise a time of the query creation by Transform Microservice 410. Field name "QUERY_TIME_UPDATED" may comprise a time of the query updated by Transform Microservice 410. Field name "DOMAIN_OBJECT_NAME" may comprise a unique Business Domain Object, such as a requisition, for example. Field name "VARIANT" may comprise an Enterprise resource planning (ERP) Variant. Field name "CLUSTER_HOSTNAME" may comprise a name of the host from which event is generated. Field name "TIMEZONE" may comprise a time zone of the event. Field name "TENANT" may comprise a type of the customer.

A query of Transformation Microservice 410 may support a combination of filters such as customer-id, customer-name, customer-ERP-variant, query-status, and query-name, to name just a few example.

Figure 7:
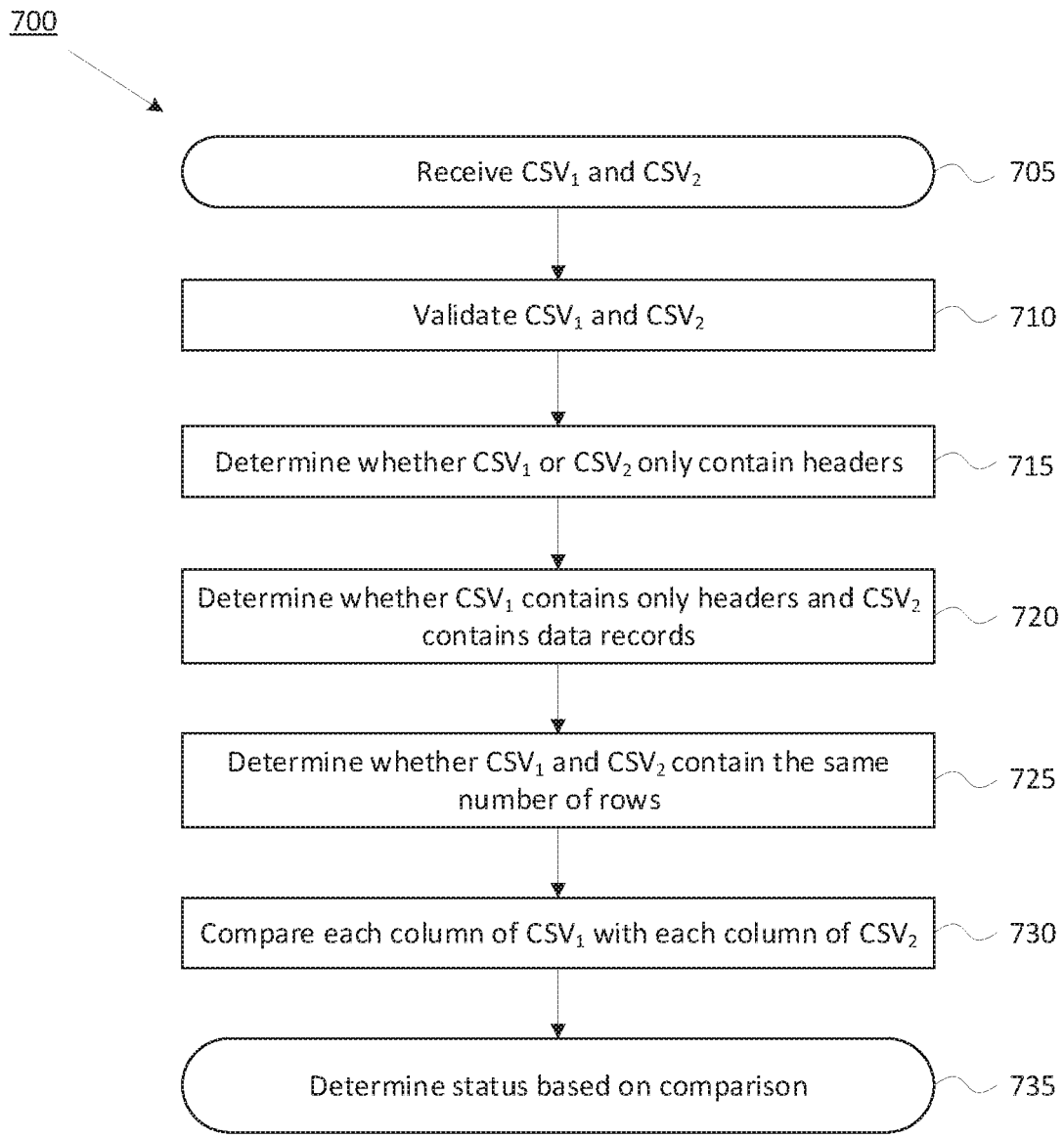
FIG. 7 is an embodiment of a flowchart of a process for implementing a Custom Compare process to compare two query result files

FIG. 7 is an embodiment 700 of a flowchart of a process for implementing a Custom Compare process to compare two query result files. Embodiments in accordance with claimed subject matter may include all of, less than, or more than blocks 705 through 735. Also, the order of blocks 705 through 735 is merely an example order. For example, a method in accordance with embodiment 700 may be performed at a server.

At operation 705, two query result files, e.g., $CSV_1$ and $CSV_2$ may be received. At operation 710, $CSV_1$ and $CSV_2$ may be checked to determine whether each of these files contains valid data. For example, neither $CSV_1$ nor $CSV_2$ should contain service down messages. At operation 715, a determination may be made as to whether $CSV_1$ or $CSV_2$ only contain headers without additional data. At operation 720, a determination is made as to whether $CSV_1$ contains only headers and $CSV_2$ contains data records. At operation 725, a determination may be made as to whether $CSV_1$ and $CSV_2$ contain the same number of rows. At operation 730, each column of $CSV_1$ made be compared with each column of $CSV_2$. Table B as shown below illustrates various actions which may be performed during a comparison of columns between $CSV_1$ and $CSV_2$.

| Action | Description |
| --- | --- |
| Whole number and decimal number comparison | If the two columns to compare has values 30 and 30.00000, the comparison algorithm does not fail |
| Empty string and a null string | If the two columns to compare has values "" and null, the comparison algorithm does not fail |
| Empty string and Boolean value | If the two columns to compare has values "" and false, the comparison algorithm does not fail |
| Empty string and integer 0 (zero) | If the two columns to compare has values "" and 0, the comparison algorithm does not fail |

For example, at operation 730, a whole number and decimal number comparison may be performed such that if two compared columns have values of 30 and 30.00000, respectively, the comparison algorithm or process does not fail. An empty string and a null string action may be performed such that if two columns to be compared have values " " and null, respectively, the comparison algorithm or process does not fail. An empty string and Boolean value action may be performed such that if two columns to be compared have values " " and false, respectively, the comparison algorithm or process does not fail. An empty string and integer 0 (zero) action may be performed such that if two columns to be compared have values " " and 0, respectively, the comparison algorithm or process does not fail.

At operation 735, a status may be determined based on the comparison. A status of "SUCCESS" may indicate that the comparison was successful. A status of "FAILURE" may indicate that the comparison was unsuccessful. A status of "SQL-DATA-EMPTY" may indicate that result of an SQL query, such as determined by a Comparison Microservice, contains only headers but that a Transformation Microservice has returned data rows. A status of "TRANSFORM-DATA-EMPTY" may indicate that result of an SQL query contains data rows but that a Transformation Microservice has returned only headers. A status of "QUERY-FAILURE" may indicate that there was a problem executing a Transformation Microservice query. A status of "ROWS-COUNT-DIFFERENT" may indicate that a number of rows is different in the CSV files. A status of "TRANSFORM-SERVICE-DOWN" may indicate that a Transformation Microservice is not serviceable at the moment. A status of "SQL-SERVICE-DOWN" may indicate that a Comparison Microservice or SQL Microservice is not serviceable at the moment. An SQL Microservice may comprise an application, such as an Application A in accordance with an embodiment, for example. A status of "TRANSFORM-AND-SQL-SERVICE-DOWN" may indicate that both a Transformation Microservice and a SQL Microservice are not serviceable at the moment. A status of "HEADERS-ONLY" may indicate that both $CSV_1$ and $CSV_2$ contain only headers.

If a status of "FAILURE" has been determined, a Compare Process may indicate which column has failure and may store the entire response of the Transformation Microservice and an SQL Microservice in compare-db 420. In the case of a "FAILURE," the difference between the columns in $CSV_1$ and $CSV_2$ may be represented in a "columns" key in a JSON file. For example, each discrepancy pair may be delimited by a "I" symbol, wherein the first value is an SQL value and the subsequent value is from the Transformation Microservice.

If a status of "SUCCESS" has been determined, this status indicates that the comparison was successful. Fields such as "columns", "completeTransformOutput" and "completeSqlOutput" may not be populated in the compare-db 420 in the occurrence of a "SUCCESS" status determination.

Figure 5:
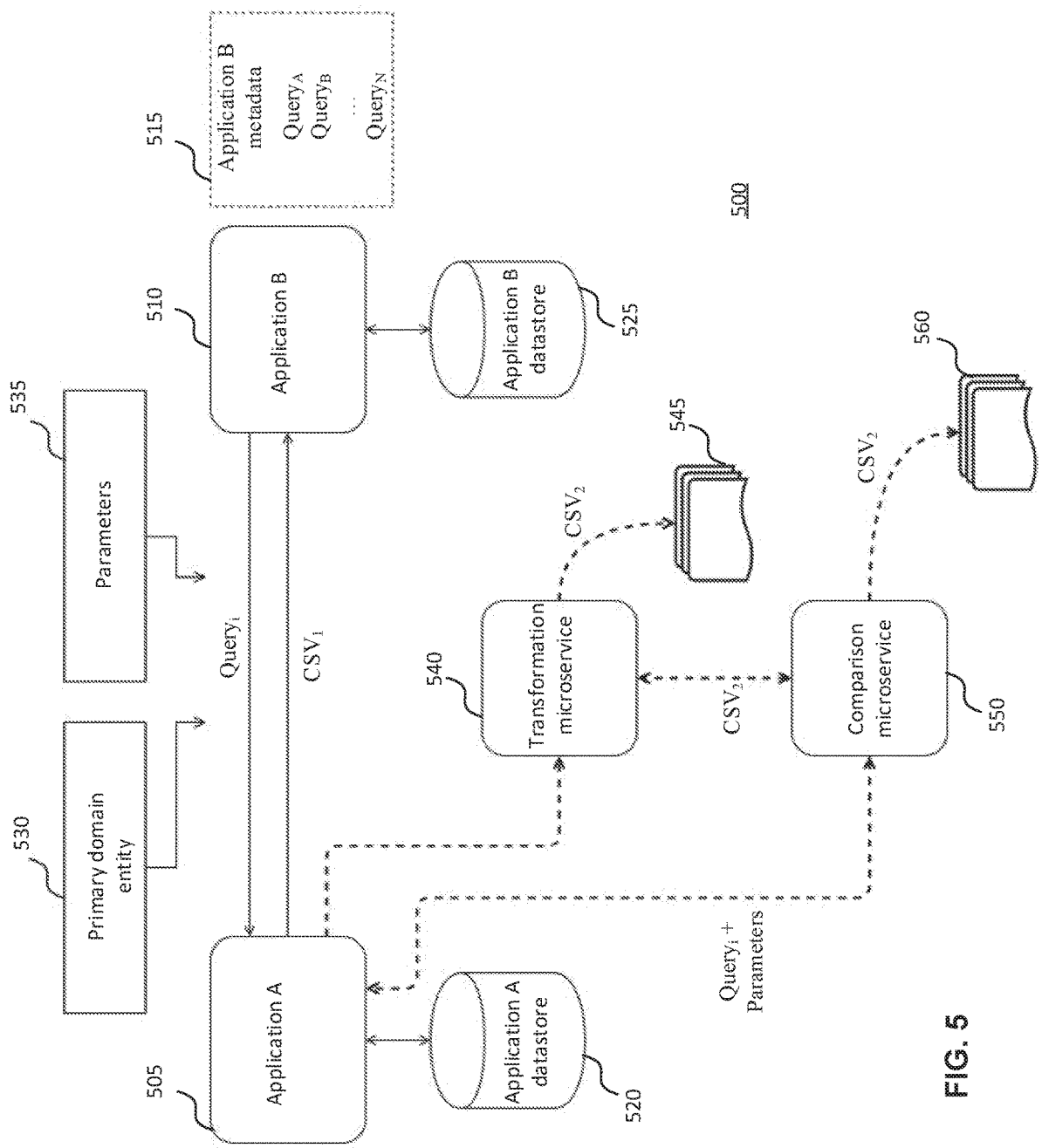
FIG. 5 illustrates an embodiment of a framework of a both a monolithic architecture and a microservice architecture to build a data pipeline between two different applications.

FIG. 5 illustrates an embodiment 500 of a framework of a both a monolithic architecture and a microservice architecture to build a data pipeline between two different applications, e.g., Application A 505 and Application B 510. Embodiment 500 illustrates various items or components, such as Application A 505, Application B 510, Application B metadata 515, Application A datastore 520, Application B datastore 525, Primary Domain Entity 530, Parameters 535, Transformation Microservice 540, Transformation Microservice Datastore 545, Comparison Microservice 550, and Comparison Microservice Datastore 560, for example.

Embodiment 500 of FIG. 5 differs from embodiment 300 of FIG. 3 in several ways. For example, Comparison Microservice 550 may receive a query and parameters from Application A 505, instead of from Application B 510 as may be performed in accordance with embodiment 300. Moreover, the query and parameters may be pulled from Application A 505 by Comparison Microservice 550 instead of being pushed to Comparison Microservice 550 from Application B 510 as may be done in accordance with embodiment 300 of FIG. 3.

In embodiment 500, Application B 510 may send $Query_i$ for execution to Application A 505. For example, Application A 505 may execute $Query_i$ on Application A datastore 520 to determine query results, which may be stored in an output file, such as $CSV_1$. As illustrated in FIG. 5, $CSV_1$ may be sent from Application A 505 to Application B 510.

Any changes to data stored in Application A data store 520 may be pushed by Application A 505 to Transformation Microservice 540. Transformation Microservice 540 may determine its own query results for $Query_i$ transmitted from Application B to Application A, so that the accuracy of the query results from Transformation Microservice 540 may be compared with the query results determined by Application A 505 and which are stored in $CSV_1$ in this example. For example, $Query_i$ may be provided to Transformation Microservice 540 by Application A 505.

Transformation Microservice 540 may execute $Query_i$ against data indicative of changes to data stored in Application A datastore 520 which have previously been received from Application A 505. For example, Transformation Microservice 540 may store query results in an output file, such as $CSV_2$, as illustrated. Transformation Microservice 540 may also provide $CSV_2$ to Comparison Microservice 550. For example, Comparison Microservice may pull $CSV_2$ from Transformation Microservice 540. As discussed above, Compare Microservice 550 may send a query to Application A 505 with parameters. Results may be stored in a CSV within Compare Microservice 550, for example.

Upon receipt of the event data, $CSV_1$, and $CSV_2$, Comparison Microservice 550 may compare the content in $CSV_1$ and $CSV_2$ to determine whether the content is identical. If, for example, the content of $CSV_1$ and $CSV_2$ is not identical, Comparison Microservice 550 may identify the differences and may store information indicative of the differences in a data store, such as in compare-db 620 described below with respect to FIG. 6. The information indicative of the difference may be considered by a coder of Transformation Microservice 540, for example. In some embodiments, a file indicative of the differences between $CSV_1$ and $CSV_2$ may be provided to Transformation Microservice 540 so that Transformation Microservice 540 may automatically adjust its own settings and/or parameters, for example.

In one particular embodiment, for example, Comparison Microservice 550 may store event data and as $CSV_1$ in a data store and may maintain a mapping between the event data and $CSV_1$. In another embodiment, for example, Comparison Microservice 550 may periodically pulls events processed from the Transformation Microservice 540 and the corresponding $CSV_2$.

Figure 6:
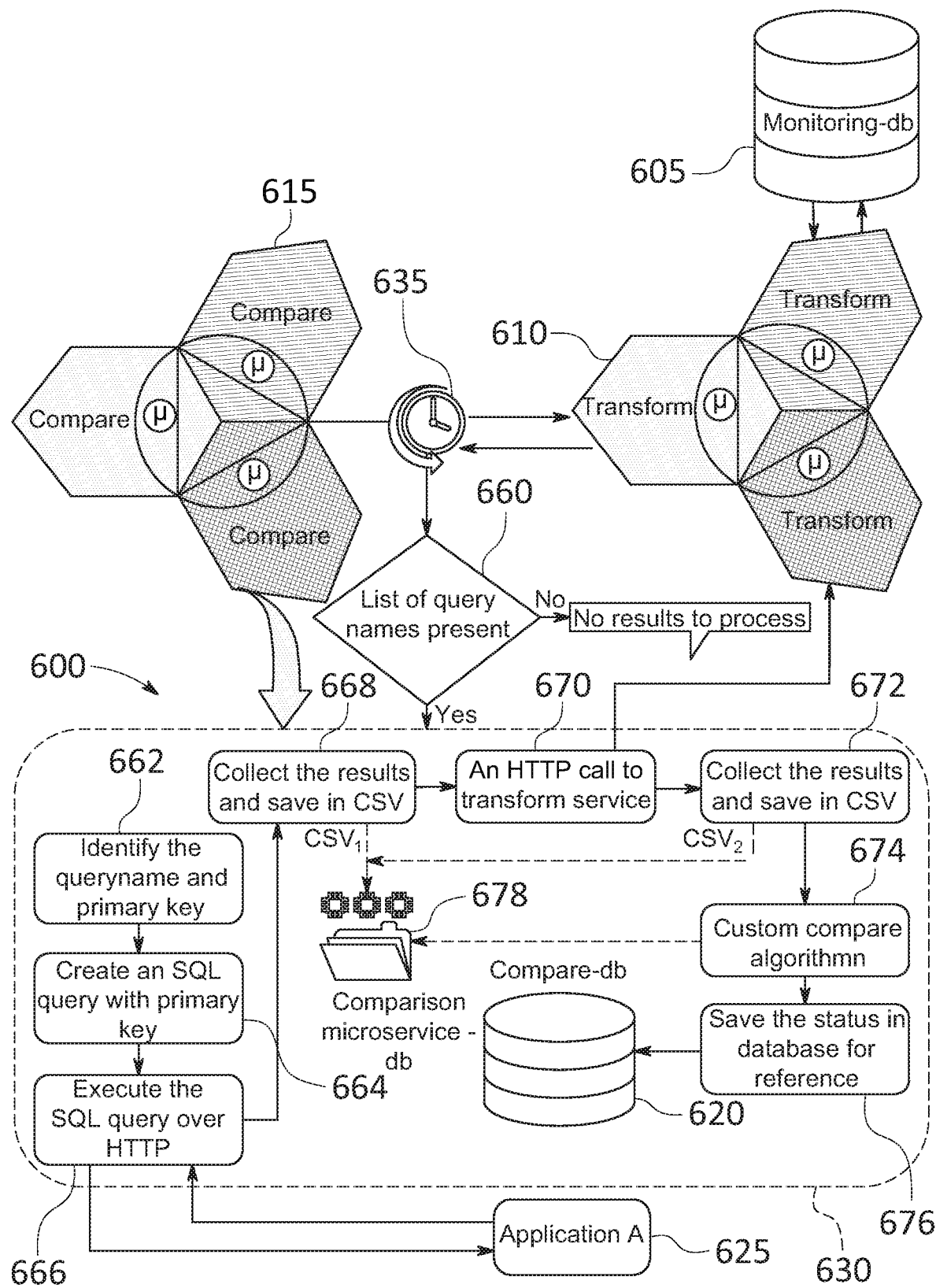
FIG. 6 is an embodiment of a flow diagram of processing of a data pipeline.

FIG. 6 is an embodiment 600 of a flow diagram of processing of a data pipeline in accordance with embodiment 500 of FIG. 5. Embodiment 600 illustrates interactions between various entities of a data pipeline, such as a monitoring-db 605, a Transformation Microservice 610, a Comparison Microservice 615, a compare db 620 and an application, such as Application A 625. Embodiment 600 may also include a Scheduler 635. Embodiment 600 of FIG. 6 also illustrates a pictorial representation 630 of Comparison Microservice 615. For example, for the sake of illustration, pictorial representation 630 is shown in FIG. 6 to illustrate internal modules, items, and/or processing which may be included within or performed by Comparison Microservice 615, for example. In embodiment 600, Transformation Microservice 610 and/or Comparison Microservice 615 may include multiple nodes, such as three nodes apiece in an example shown in FIG. 6, although it should be appreciated that more or fewer nodes may be utilized in some embodiments.

Embodiment 600 differs from embodiment 400 in several ways. For example, in embodiment 600, event data may be pulled from Application A 625 by Comparison Microservice 615 as the events happen. Data pulled from Application A 625 may include a pair of event data and a CSV file associated with that event. The CSV file may include the output of the event which may be generated in response to executing a query.

Every event which is executed by Application A 625, such as a create, edit, or delete event for a business domain object, may be logged into Transformation Microservice 610. Transform Microservice 610 may store all changes relating to one or more fields of such event data in monitoring-db 605. Each event may be associated with a unique event ID. The unique event ID may act or serve as a primary key, and a customer ID may serve as a secondary ID for the event data change, for example.

Scheduler 635 may query the Transform Microservice 610 at certain time intervals, such as every five minutes in one particular implementation. However, the Scheduler 635 may be configured to query the Transformation Microservice 610 at different time intervals in other implementations, for example. A query sent from Scheduler 635 to Transformation Microservice 610 may indicate a start time and an end time for the query. Upon receipt of a query from Scheduler 635, Transformation Microservice 610 may query monitoring-db 605 to identify whether any business objects have been updated, created, or deleted within a requested time interval and may receive results of this query from the monitoring-db 605. The changes received from the monitoring-db 605 may be collated or arranged into an agreed-upon form or format, such as a JSON file, and may be sent to Comparison Microservice 615. If the JSON file indicates that there are no results to process, such as where there were no changes within the requested time interval, then Scheduler 635 may wait until the next time interval to send another query to Transformation Microservice 610. For example, the end time for the query may comprise the current time and the start time may comprise a time which is five minutes prior.

If query results are received by Scheduler 635, a determination may be made as to a list of query names present at operation 660. If there are no results to process, then the Comparison Microservice 615 may wait until there are query results to process. However, at operation 660, if there are query results, the Comparison Microservice 615 may process those query results. For example, at operation 662, a query name and a primary key may be identified within the list of query names received by Comparison Microservice 615. At operation 664, a query, such as an SQL query, may be created with the primary key. At operation 666, the SQL query may be executed over HTTP. For example, the SQL query may be sent to Application A 625 for execution and query results may be provided by Application A. The query results received from Application A 625 may be collected and saved in a CSV file, such as $CSV_1$. For example, $CSV_1$ may be stored in a memory or database accessible to Comparison Microservice 615, such as Comparison Microservice db 678. After saving $CSV_1$, an HTTP call may be sent to Transformation Microservice 610 to generate query results based on querying change data from Application A 625 which has been collected or stored by Transformation Microservice 610. Query results from Transformation Microservice 610 may be collected at operation 672 and saved in a CSV file, such as $CSV_2$. At operation 674, a custom compare algorithm, such as discussed with respect to embodiment 700 of FIG. 7, may be implemented or custom compare processing may be performed to compare the query results of $CSV_1$ and $CSV_2$. Results of the custom compare processing may be saved within compare db 620 at operation 676. For example, a status of the comparison may be saved in the compare db 620 for future reference or future process, such as to refine or modify one or more operations of the Comparison Microservice 615 until the results of future determinations of $CSV_1$ and $CSV_2$ are identical.

Figure 8:
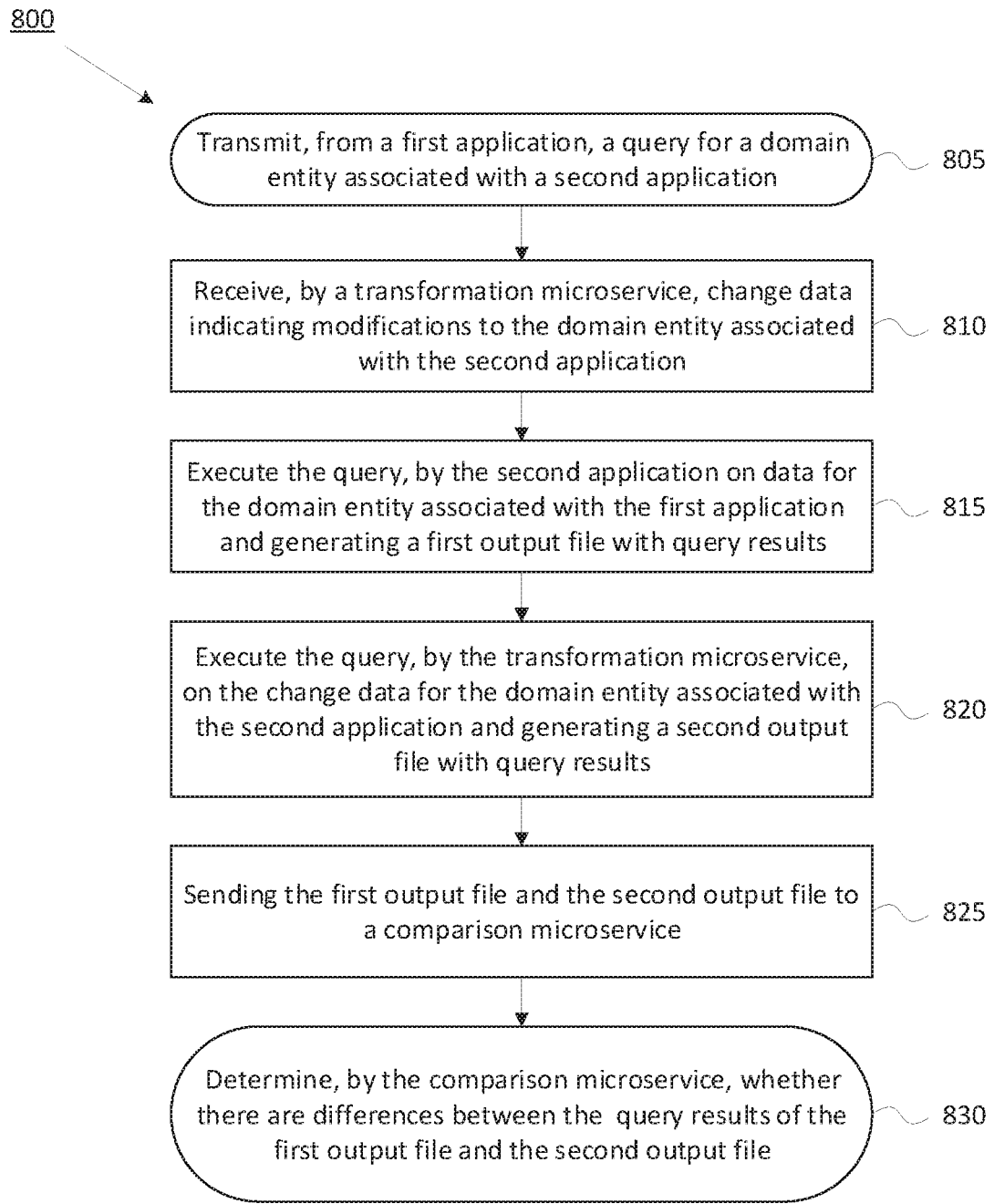
FIG. 8 is an embodiment of a flowchart of a process for comparing the outputs of different data pipelines.

FIG. 8 is an embodiment 800 of a flowchart of a process for comparing the outputs of different data pipelines. Embodiments in accordance with claimed subject matter may include all of, less than, or more than blocks 805 through 830. Also, the order of blocks 805 through 830 is merely an example order. For example, a method in accordance with embodiment 800 may be performed at one or more servers.

At operation 805, a first application may transmit a query for a domain entity associated with a second application. At operation 810, a transformation microservice may receive change data indicating modifications to the domain entity associated with the second application. At operation 815, the second application may execute the query on data for the domain entity associated with the first application and may generate a first output file with query results. At operation 820, the transformation microservice may execute the query on the change data for the domain entity associated with the second application and may generate a second output file with query results. At operation 825, the first output file and the second output file may be sent to a comparison microservice. At operation 830, the comparison microservice may determine whether there are differences between the query results of the first output file and the second output file.

Figure 9:
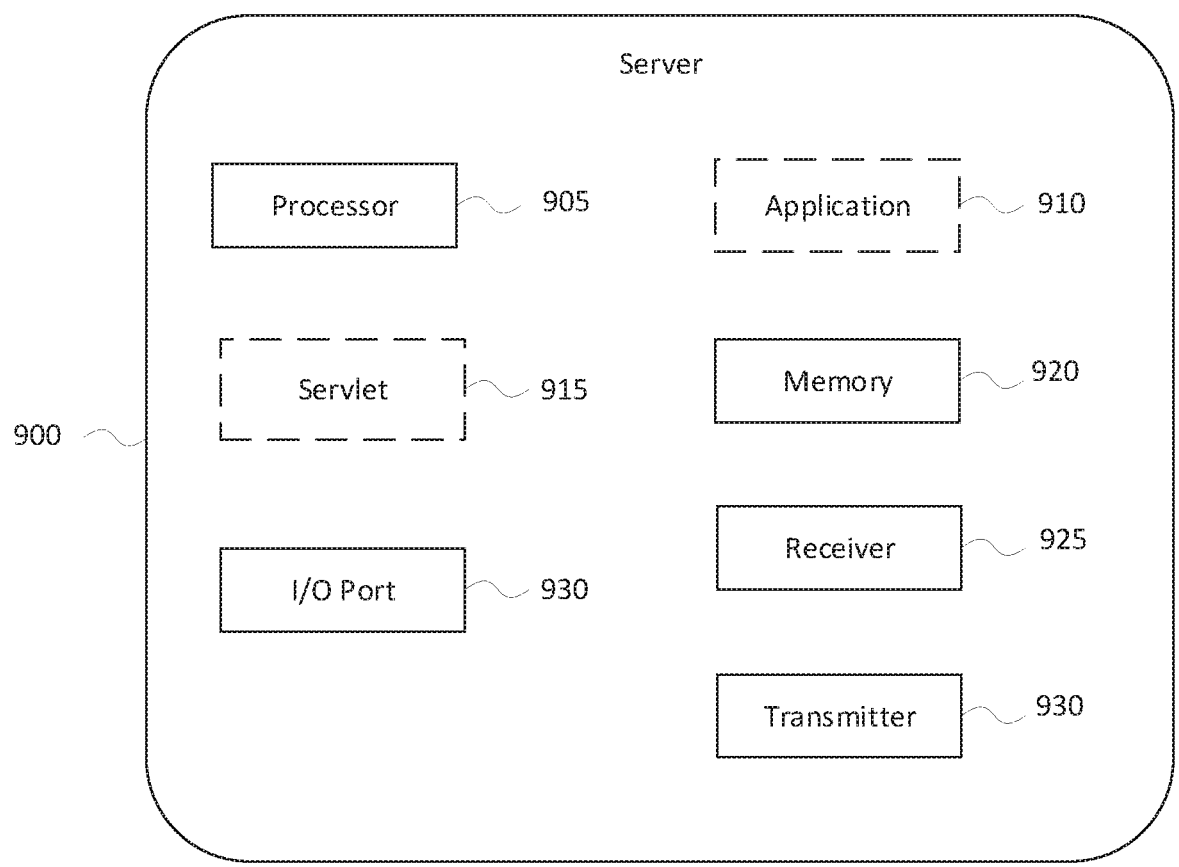
FIG. 9 illustrates a server according to an embodiment

FIG. 9 illustrates a server 900 according to an embodiment. Server 900 may include a processor 905. Processor 905 may be utilized to execute an application 910. Processor 905 may also be utilized to execute or otherwise implement a servlet 915. Server may include additional components, such as a memory 920, a receiver 925, a transmitter 930*m* and an Input/Output (I/O) port 935. Processor 905 may execute computer-executable code stored in memory 920 which may be related to application 910 and/or servlet 915. Application 910 of server 900 may communicate with an application and/or microservice of another server, for example. For example, server 900 may communicate via receiver 925, transmitter 930, and/or I/O port 935.

Some portions of the detailed description are presented herein in terms of algorithms or symbolic representations of operations on binary digital signals stored within a memory of a specific apparatus or special purpose computing device or platform. In the context of this particular specification, the term specific apparatus or the like includes a general-purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated.

It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

It should be understood that for ease of description, a network device (also referred to as a networking device) may be embodied and/or described in terms of a computing device. However, it should further be understood that this description should in no way be construed that claimed subject matter is limited to one embodiment, such as a computing device and/or a network device, and, instead, may be embodied as a variety of devices or combinations thereof, including, for example, one or more illustrative examples.

The terms, "and", "or", "and/or" and/or similar terms, as used herein, include a variety of meanings that also are expected to depend at least in part upon the particular context in which such terms are used. Typically, "or" if used to associate a list, such as A, B or C, is intended to mean A, B, and C, here used in the inclusive sense, as well as A, B or C, here used in the exclusive sense. In addition, the term "one or more" and/or similar terms is used to describe any feature, structure, and/or characteristic in the singular and/or is also used to describe a plurality and/or some other combination of features, structures and/or characteristics. Likewise, the term "based on" and/or similar terms are understood as not necessarily intending to convey an exclusive set of factors, but to allow for existence of additional factors not necessarily expressly described. Of course, for all of the foregoing, particular context of description and/or usage provides helpful guidance regarding inferences to be drawn. It should be noted that the following description merely provides one or more illustrative examples and claimed subject matter is not limited to these one or more illustrative examples; however, again, particular context of description and/or usage provides helpful guidance regarding inferences to be drawn.

A network may also include now known, and/or to be later developed arrangements, derivatives, and/or improvements, including, for example, past, present and/or future mass storage, such as network attached storage (NAS), a storage area network (SAN), and/or other forms of computing and/or device readable media, for example. A network may include a portion of the Internet, one or more local area networks (LANs), one or more wide area networks (WANs), wire-line type connections, wireless type connections, other connections, or any combination thereof. Thus, a network may be worldwide in scope and/or extent. Likewise, sub-networks, such as may employ differing architectures and/or may be substantially compliant and/or substantially compatible with differing protocols, such as computing and/or communication protocols (e.g., network protocols), may interoperate within a larger network. In this context, the term sub-network and/or similar terms, if used, for example, with respect to a network, refers to the network and/or a part thereof. Sub-networks may also comprise links, such as physical links, connecting and/or coupling nodes, such as to be capable to transmit signal packets and/or frames between devices of particular nodes, including wired links, wireless links, or combinations thereof. Various types of devices, such as network devices and/or computing devices, may be made available so that device interoperability is enabled and/or, in at least some instances, may be transparent to the devices. In this context, the term transparent refers to devices, such as network devices and/or computing devices, communicating via a network in which the devices are able to communicate via intermediate devices of a node, but without the communicating devices necessarily specifying one or more intermediate devices of one or more nodes and/or may include communicating as if intermediate devices of intermediate nodes are not necessarily involved in communication transmissions. For example, a router may provide a link and/or connection between otherwise separate and/or independent LANs. In this context, a private network refers to a particular, limited set of network devices able to communicate with other network devices in the particular, limited set, such as via signal packet and/or frame transmissions, for example, without a need for re-routing and/or redirecting transmissions. A private network may comprise a stand-alone network; however, a private network may also comprise a subset of a larger network, such as, for example, without limitation, all or a portion of the Internet. Thus, for example, a private network "in the cloud" may refer to a private network that comprises a subset of the Internet, for example. Although signal packet and/or frame transmissions may employ intermediate devices of intermediate nodes to exchange signal packet and/or frame transmissions, those intermediate devices may not necessarily be included in the private network by not being a source or destination for one or more signal packet and/or frame transmissions, for example. It is understood in this context that a private network may provide outgoing network communications to devices not in the private network, but devices outside the private network may not necessarily be able to direct inbound network communications to devices included in the private network.

While certain exemplary techniques have been described and shown herein using various methods and systems, it should be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter may also include all implementations falling within the scope of the appended claims, and equivalents thereof.

What is claimed is:

1. A method, comprising:
    transmitting, from a first application, a query for a domain entity associated with a second application;
    receiving, by a transformation microservice, change data indicating modifications to one or more data items of the domain entity associated with the second application, wherein the change data is pushed to the transformation microservice in response to performance of the modifications to the one or more data items;
    executing the query, by the second application on data for the domain entity associated with the second application and generating a first data pipeline output file with query results;
    executing the query, by the transformation microservice, on the change data for the domain entity associated with the second application and generating a second data pipeline output file with query results;
    sending the first data pipeline output file and the second data pipeline output file to a comparison microservice;
    determining, by the comparison microservice, whether there are differences between the query results of the first data pipeline output file and the second data pipeline output file.

2. The method of claim 1, wherein the first data pipeline output file and the second data pipeline output file comprise a comma-separated values (CSV) files.

3. The method of claim 1, wherein the first data pipeline output file is pushed to the comparison microservice.

4. The method of claim 1, wherein the first data pipeline output file is pulled from the second application by the comparison microservice.

5. The method of claim 1, wherein the comparison microservice generates an HyperText Transfer Protocol (HTTP) call to the transformation microservice to request that the query be performed.

6. The method of claim 1, further comprising periodically querying the transformation microservice to determine whether the change data in a monitoring database has been updated.

7. The method of claim 1, wherein a status of a comparison is determined based on the determination of whether there are differences between the query results of the first data pipeline output file and the second data pipeline output file.

8. The method of claim 7, further comprising saving the status in a comparison database.

9. A system, comprising:
    a first server to execute a first application, the first application to transmit a query for a domain entity associated with a second application;
    a second server to execute the second application, the second application to execute the query on data for the domain entity associated with the second application and to generate a first data pipeline output file with query results;
    a third server to implement a transformation microservice, the transformation microservice to receive change data indicating modifications to the domain entity associated with the second application and execute the query on the change data for the domain entity associated with the second application and generating a second data pipeline output file with query results, wherein the change data is pushed to the transformation microservice in response to performance of the modifications to the one or more data items;
    a fourth server to implement a comparison microservice, wherein the comparison microservice is to:
        obtain the first data pipeline output file and the second data pipeline output file, and
        determine whether there are differences between the query results of the first data pipeline output file and the second data pipeline output file.

10. The system of claim 9, wherein the first data pipeline output file and the second data pipeline output file comprise a comma-separated values (CSV) files.

11. The system of claim 9, wherein the first data pipeline output file is to be pulled from the second application by the comparison microservice.

12. The system of claim 9, wherein the comparison microservice is to generate an HyperText Transfer Protocol (HTTP) call to the transformation microservice to request that the query be performed.

13. The system of claim 9, wherein the comparison microservice is to periodically query the transformation microservice to determine whether the change data in a monitoring database has been updated.

14. The system of claim 9, wherein the first server, the second server, and third server, and the fourth server are deployed in a cloud-based environment.

15. An article, comprising:
    a non-transitory storage medium comprising machine-readable instructions executable by a special purpose apparatus to:
    transmitting a query generated by a first application for a domain entity associated with a second application;
    process received change data indicating modifications to one or more data items of the domain entity associated with the second application, wherein the change data is pushed to a transformation microservice in response to performance of modifications to the one or more data items;
    executing the query on data for the domain entity associated with the second application and generate a first data pipeline output file with query results;
    executing the query on the change data for the domain entity associated with the second application and generate a second data pipeline output file with query results;

determine whether there are differences between the query results of the first data pipeline output file and the second data pipeline output file.

16. The article of claim 15, wherein the first data pipeline output file and the second data pipeline output file comprise a comma-separated values (CSV) files.

17. The article of claim 15, wherein the machine-readable instructions are further executable by the special purpose apparatus to generate an HyperText Transfer Protocol (HTTP) call to request that the query be performed.

18. The article of claim 15, wherein the machine-readable instructions are further executable by the special purpose apparatus to periodically query a transformation microservice to determine whether the change data in a monitoring database has been updated.

19. The article of claim 15, wherein the machine-readable instructions are further executable by the special purpose apparatus to determine the status of a comparison is based on the determination of whether there are differences between the query results of the first data pipeline output file and the second data pipeline output file.

20. The article of claim 15, wherein the machine-readable instructions are further executable by the special purpose apparatus to save the status in a comparison database.

* * * * *